United States Patent [19]
Honbo

[11] Patent Number: 5,570,195
[45] Date of Patent: Oct. 29, 1996

[54] IMAGE FORMING APPARATUS WHICH DETECTS SCANNING LIGHT THROUGH SLITTED SHIELD PLATE

[75] Inventor: Tsunao Honbo, Tokyo, Japan

[73] Assignee: Canon Kabushiki Kaisha, Tokyo, Japan

[21] Appl. No.: 29,047

[22] Filed: Mar. 9, 1993

[30] Foreign Application Priority Data

Mar. 10, 1992 [JP] Japan .................................. 4-86180

[51] Int. Cl.$^6$ .............................. H04N 1/21; G01D 9/42
[52] U.S. Cl. ........................ 358/302; 347/248; 347/250; 347/256
[58] Field of Search .................................. 347/129, 133, 347/134, 246, 248, 250, 256, 258, 260, 261; 358/302

[56] References Cited

U.S. PATENT DOCUMENTS 4,201,994 5/1980 Hoshito et al. .......................... 346/108
5,105,296 4/1992 Cho et al. ............................... 359/196

Primary Examiner—Brian W. Brown
Assistant Examiner—Randy W. Gibson
Attorney, Agent, or Firm—Fitzpatrick, Cella, Harper & Scinto

[57] ABSTRACT

An image forming apparatus for forming images by allowing a light beam to be scanned and exposed on a photosensitive body includes a single detecting device for detecting the light beam scanned and exposed onto the photosensitive body, a plurality of signal generating devices for generating a predetermined control signal on the basis of an output from the detecting device, and an output control device for controlling the routing of an optical signal output which is output from the detecting device to the objective signal generating device.

20 Claims, 5 Drawing Sheets

SLIT PATTERN 201 FOR DETECTING BD

SLIT 202 FOR DETECTING AF

SLIT 203 FOR ADJUSTING SCANNING POSITION OF LASER LIGHT

IMAGE FORMING APPARATUS WHICH DETECTS SCANNING LIGHT THROUGH SLITTED SHIELD PLATE

BACKGROUND OF THE INVENTION

1. Field of the Invention

The present invention relates to an image forming apparatus for forming images on a photosensitive body by allowing a light beam to be scanned and exposed thereon and, more particularly, to an image forming apparatus for receiving a light beam from light detecting means and generating a control signal required for image formation.

2. Related Background Art

Hitherto, an apparatus of the above type has a scanning optical system formed of a polygon mirror, an image forming optical system (including a fθ lens) or the like for allowing a light beam emitted from a semiconductor laser to be scanned onto a photosensitive body, which image forming optical system comprises first light detecting means for generating a timing signal in the direction of the main scanning in response to the reception of the light beam scanned by the scanning optical system when a non-image formed area on the photosensitive body is being scanned and second light detecting means for receiving a light beam to adjust the focus of the light beam when a non-image formed area on the photosensitive body is being scanned. The first and second light detecting means detect a light beam independently of each other so that an image is formed and the focus is controlled.

Therefore, a plurality of means for detecting a light beam are required for each object to be detected, causing a problem in that the cost of detection circuits is increased.

SUMMARY OF THE INVENTION

An object of the present invention is to solve the above-described problems of the prior art.

Another object of the present invention is to provide an image forming apparatus capable of inexpensively performing multi-purpose signal generation processing by a single optical detection mechanism by routing an optical signal output corresponding to a light beam detected by detecting means to a plurality of signal generating means at desired timings.

The image forming apparatus in accordance with the present invention comprises detecting means for continuously detecting a light beam scanned and exposed on a photosensitive body, a plurality of signal generating means for generating predetermined control signals on the basis of an optical signal output which is output from the detecting means, and output control means for controlling the routing of an optical signal output which is output from the detecting means to any one of the signal generating means.

The present invention makes multi-purpose signal generation processing possible with a single optical detection mechanism by controlling the routing of an optical signal output which are output one after another from the detecting means to any one of the signal generating means when a light beam scanned and exposed on a photosensitive body is detected continuously by the detecting means.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will be explained below with reference to the accompanying drawings.

Figure 1:
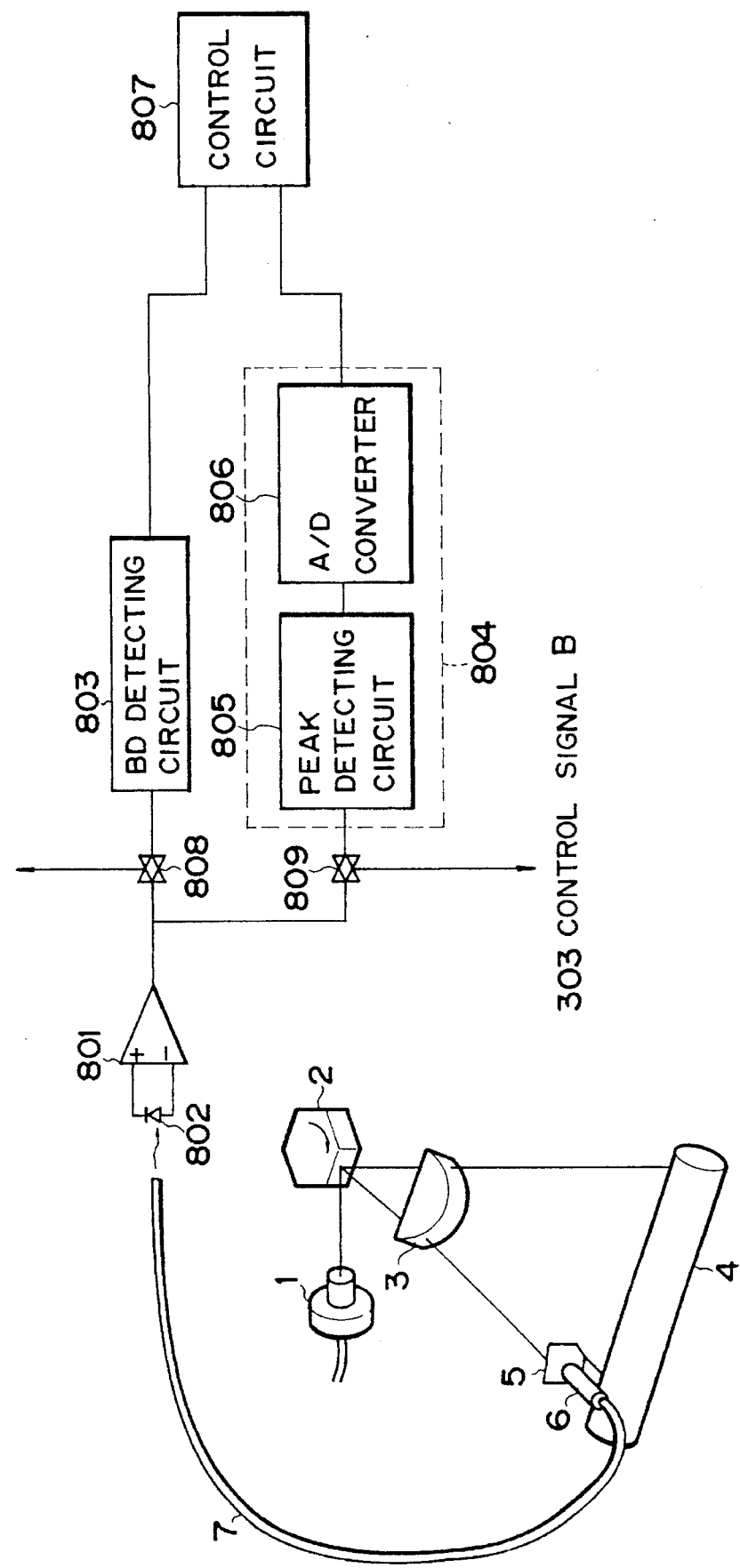
FIG. 1 is an illustration of the construction of an optical detection mechanism of an image forming apparatus in accordance with an embodiment of the present invention.

FIG. 1 is an illustration of the construction of an optical detection mechanism of an image forming apparatus in accordance with an embodiment of the present invention.

In FIG. 1, reference numeral 1 denotes a semiconductor laser which emits a laser beam modulated on the basis of image data output from a laser driving circuit (not shown); reference numeral 2 denotes a polygon mirror which is rotated at a high speed in the direction of an arrow by a scanner motor (not shown); reference numeral 3 denotes a fθ lens (image forming lens) for making constant the scanning speed of a laser beam scanned on a light-sensitive drum 4; reference numeral 5 denotes a chart in which slit patterns which will be described-later are provided; reference numeral 6 denotes a lens for condensing a light beam transmitted through the chart 5; reference numeral 7 denotes an optical fiber cable by which a light beam condensed by the lens 6 is transmitted to an optical sensor 802, formed of photodiodes or the like, of a detector 801. The detector 801 amplifies optical signals detected by the optical sensor 802 and outputs the signals to a multi-system of BD detection processing and focus processing systems. Reference numerals 808 and 809 denote switches whose opening and closing is controlled respectively by control signals 302 and 303 sent out from an unillustrated control section.

Reference numeral 803 denotes a BD detecting circuit for shaping a beam detected signal output from the detector 801 at a predetermined slice level when the switch 808 is active and sends out a writing timing signal (BD signal) in the direction of the main scanning, i.e., a horizontal synchronization signal, to a control circuit 807.

Reference numeral 804 denotes an auto-focus ("AF") circuit. This circuit 804 is formed of a peak detection circuit 805 for detecting the peak value of beam detect signals output from a detector 801 when the switch 809 is active, an A/D converter 806 for converting a peak value detected by the peak detection circuit 805, or the like, and sends out a peak value data output from the A/D converter 806 to the control circuit 807.

In the image forming apparatus constructed as described above, when detecting means (the detector 801 in this embodiment) detects a light beam continuously scanned and exposed on a photosensitive body, multi-purpose signal generating processing is made possible with a single optical detection mechanism by the output control means (switches 808 and 809) controlling an optical signal output from the detecting means so that the signal is transferred to any one of signal generating means as a transfer destination.

Figure 2:
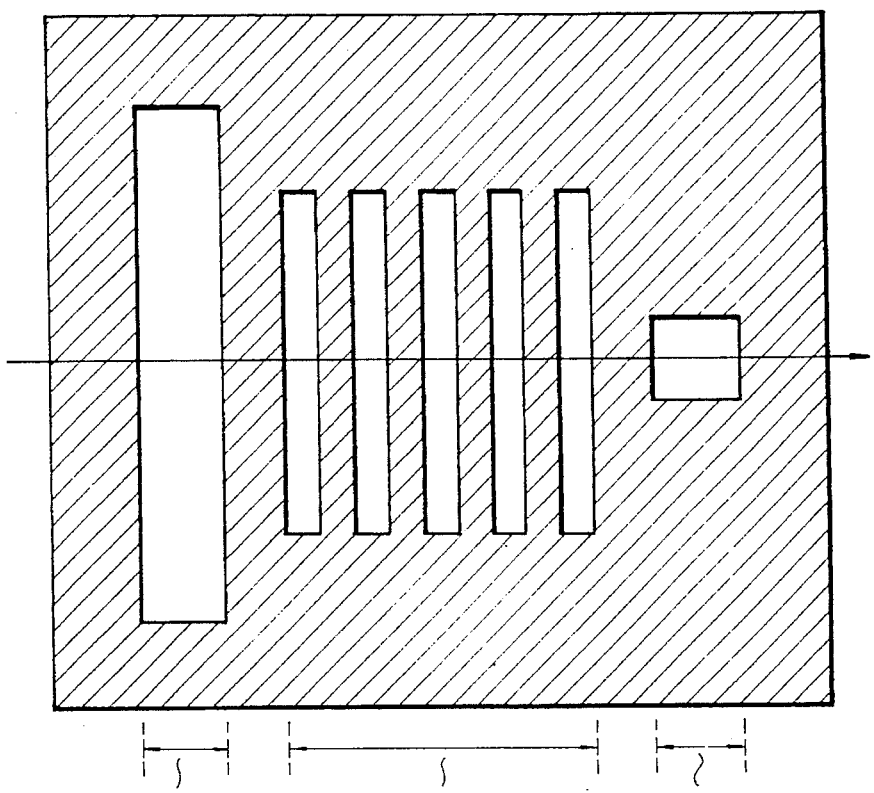
FIG. 2 is an enlarged plan view illustrating the details of the chart shown in FIG. 1.

FIG. 2 is an enlarged plan view illustrating the details of the chart 5 shown in FIG. 1.

As shown in this figure, a slit pattern 201 for detecting BD, a plurality of slits 202 for detecting AF, and a slit 203 for adjusting the position at which a laser beam is scanned are positioned in order in the direction of scanning on the chart 5. The laser beam scans in the direction of the arrow. The shaded portion in the figure indicates a metallic film disposed on glass.

Figure 3:
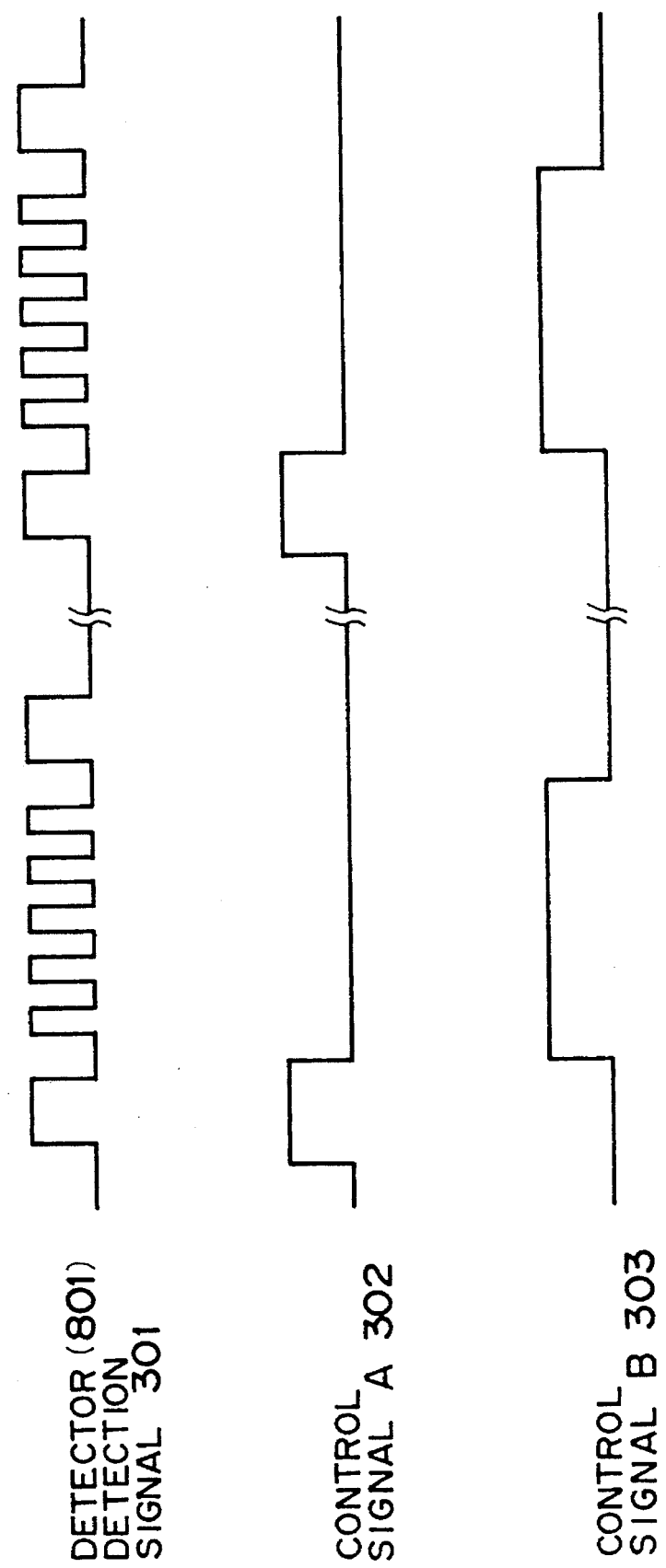
FIG. 3 is a timing chart illustrating the operation of the detection mechanism shown in FIG. 1.

Next, the operation of this embodiment shown in FIG. 1 will be explained with reference to the timing chart shown in FIG. 3.

The laser beam is sent out to the detector 801 through the chart 5 on the photosensitive drum 4, the lens 6 and the optical fiber cable 7 each time the photosensitive drum 4 is scanned. Since the laser beam is scanned on the chart 5 which has slits, it is converted into optical signals corresponding to the shape of each slit. The converted optical signals are condensed by the lens 6 and sent out to the detector 801 through the optical fiber cable 7. The optical signal is converted into a detection signal 301 shown in FIG. 3 by the optical sensor 802. The detection signal 301 is input to the BD detecting circuit 803 and an AF circuit 804 by the switches 808 and 809 whose opening and closing is controlled respectively by the control signal 302 and 303. The BD detecting circuit 803 amplifies the detection signal 301 and then sends out the signal to the control circuit 807. The AF circuit 804 detects the maximum value and the minimum value of the amplitude of the detection signal 301 by using the peak detection circuit 805, converts the value into a digital value by the A/D converter 806, and outputs the value to the control circuit 807. That is, even though the detection signal 301 is formed by combining two types of signals, each one can be extracted from the other by either control signal 302 or 303.

As described above, a laser beam can be detected for various purposes With a single detector 801 by continuously detecting a laser beam transmitted through the chart 5 by varying the shape of the slits of the chart 5.

In the above embodiment, a case has been explained in which a laser beam is detected for various purposes by the detector 801 through the optical fiber cable 7 and through the chart 5 as previously mentioned. In the chart 5, the slit pattern 201 for detecting the BD signal, the slit 202 for detecting AF, and the slit 203 for adjusting the position at which a laser beam is scanned are arranged in the direction of scanning. However, as shown in FIG. 3t the slit 202, the slit 203 and the slit pattern 201 each may be separated into two systems so that a laser beam is detected by a single detector 801.

Figure 4:
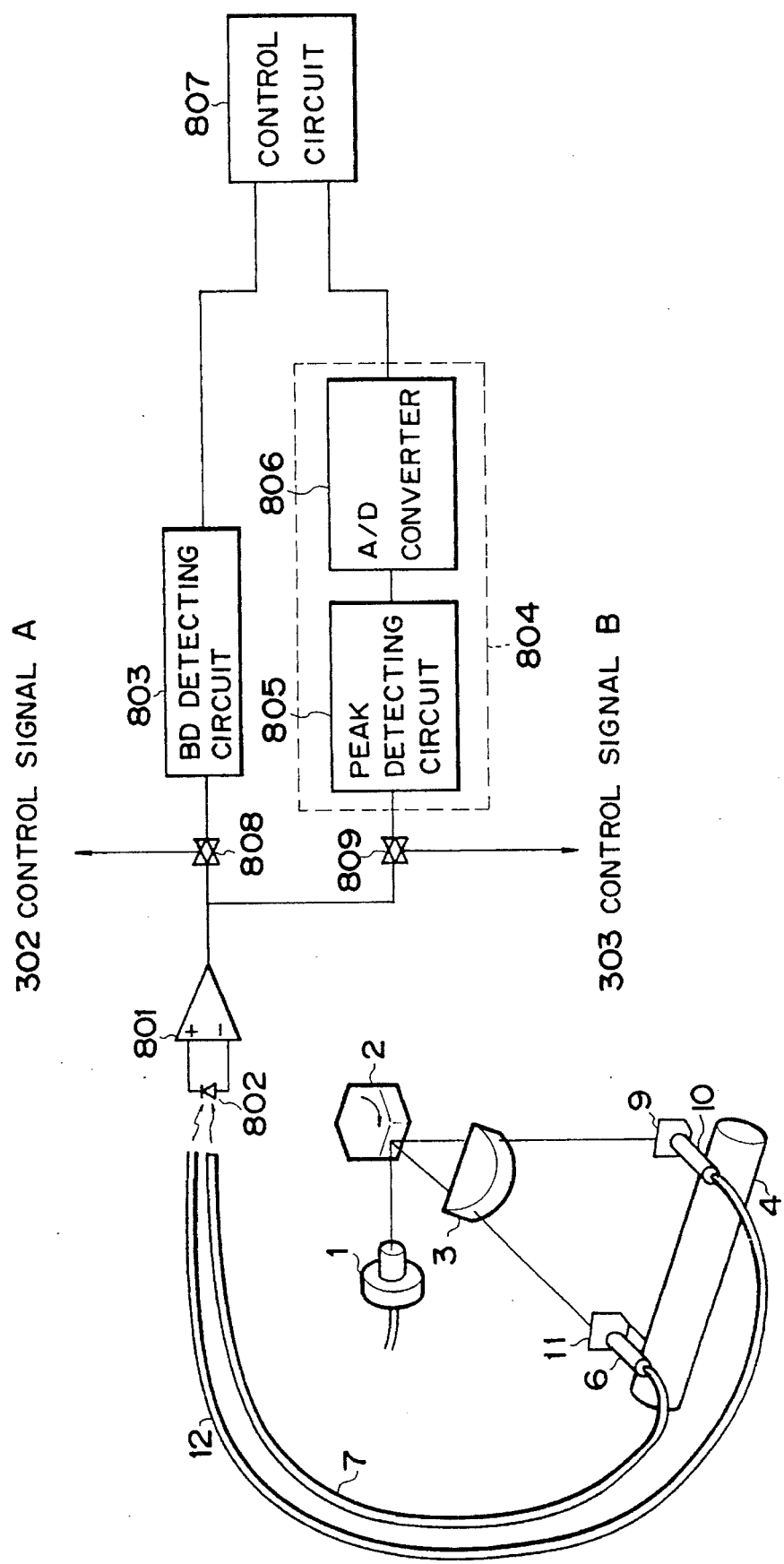
FIG. 4 is an illustration of the construction of an optical detection mechanism of an image forming apparatus in accordance with another embodiment of the present invention.

FIG. 4 is an illustration of the construction of an optical detection mechanism of an image forming apparatus in accordance with another embodiment of the present invention. Components which are the same as in FIG. 1 are given the same reference numerals.

In FIG. 4, reference numerals 9 and 11 denote charts. In the chart 9, a metallic film is disposed on glass so that only the slit pattern 201 for detecting BD is formed on the glass. In the chart 11, a metallic film is disposed on glass so that the slits 202 for detecting AF and the slit 203 for adjusting the position at which a laser beam scans are formed on the glass. Reference numeral 10 denotes a lens which condenses a laser beam transmitted through the chart 9 and transmits an optical beam to the detector 801 through an optical fiber cable 12. The operation of this embodiment is substantially the same as in the above-described embodiment, and thus an explanation thereof is omitted.

As described above, since separation has been made into the chart 11 having the slits 202 for detecting AF and the slit 203 for adjusting the position at which a laser beam is scanned and into the chart 9 having the slit pattern 201 for detecting BD, a BD signal can be detected with a high degree of precision.

Figure 5:
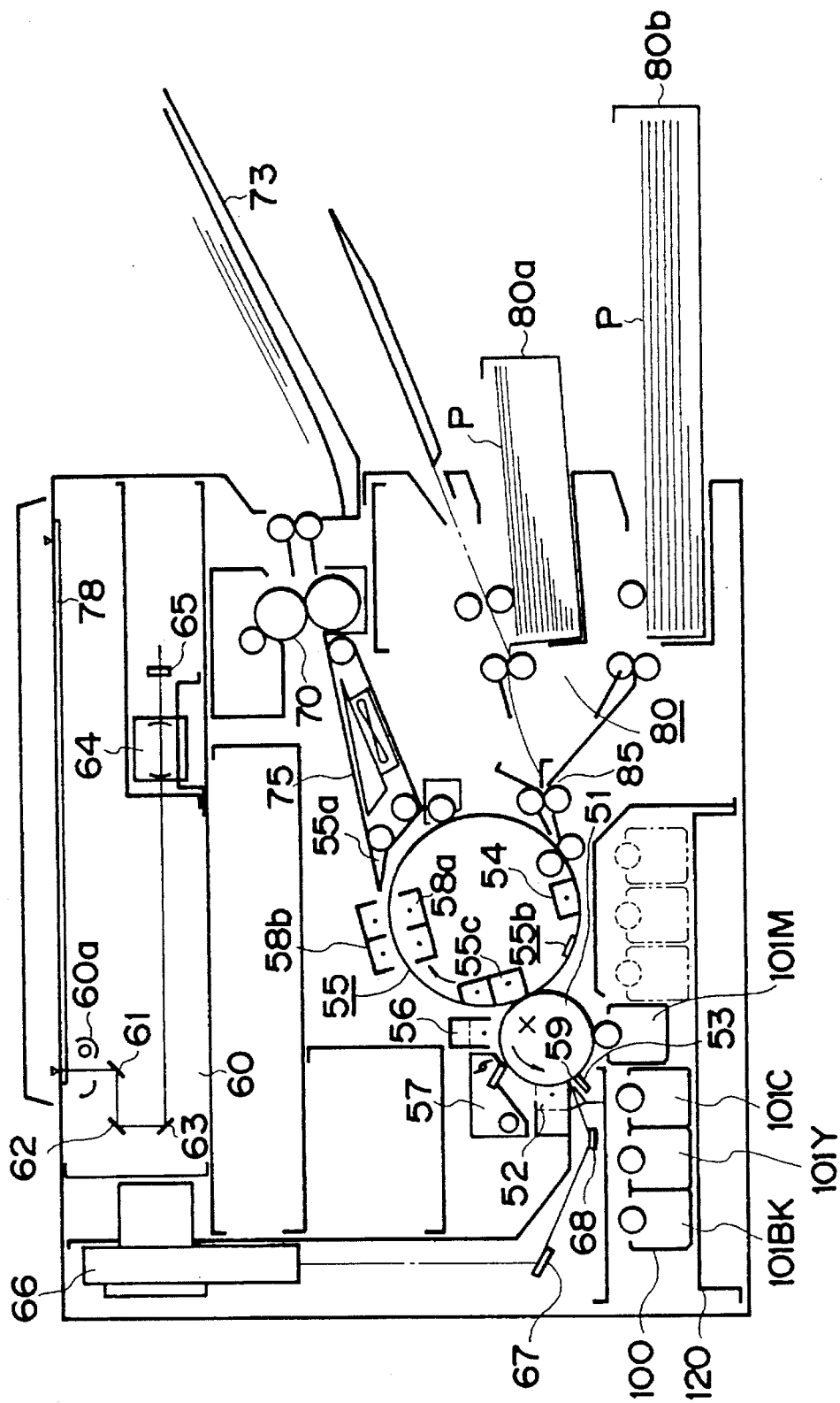
FIG. 5 is a sectional view illustrating an image forming apparatus having the optical detection mechanism shown in FIG. 1 or 4.

FIG. 5 is a sectional view illustrating an image forming apparatus having the optical detection mechanism shown in FIG. 1 or 4. It shows an example of a full-color image forming apparatus capable of performing an electrophotographic process in which an electrostatic latent image formed on a photosensitive body by a laser beam is developed using toner.

The construction and operation of this apparatus will be explained below.

A photosensitive drum 51 having a photosensitive layer on the surface thereof is rotated in the X direction as indicated by the arrow. A primary charger 52 is disposed on the left side of the photosensitive drum 51, and a surface electrical-potential sensor 53 for measuring the electrical-potential of the surface of the photosensitive drum 51 is disposed obliquely to the left of and below the photosensitive drum 51. A developing apparatus 100, movable from side to side, equipped with a plurality of developing units 101M, 101C, 101Y and 101BK which use a two-component developer in which toner is mixed with a carrier, is disposed directly below the photosensitive drum 51. A transfer apparatus (transfer drum) 55 is disposed obliquely above the photosensitive drum 51. A pre-static eliminator 56 for reducing the adhesive power of the toner on the drum remaining on the surface of the photosensitive drum 51 so as to facilitate cleaning is disposed substantially directly above the photosensitive drum 51, and a cleaning apparatus 57 is disposed obliquely above the photosensitive drum 51.

An optical system 60 is disposed in the upper section of the main body of this apparatus so that a manuscript image on a platen glass 78 is projected onto the photosensitive drum 51 by an exposure section 59 between the primary charger 52 and the surface electrical-potential sensor 53. The optical system 60 comprises a lamp 60a, a first scanning mirror 61, a second scanning mirror 62 which is moved in the same direction and at half the same speed as those of the first scanning mirror 61, a third scanning mirror 63, an image-forming mirror 64, an image sensor 65 of a type integral with a RGB filter, formed of a CCD or the like, a laser scanner unit 66, and fixed mirrors 67 and 68.

In the optical system 60, the lamp 60a which serves as a manuscript illumination source, is designed to move together with the first scanning mirror 61. Therefore, an image formed by reflected light from a manuscript scanned by the first to third mirrors 61 to 63 is passed through the image-forming mirror 64 and then is always projected onto the light receiving surface of the image sensor 65 having a RGB three-color separation filter. Further, a fixing apparatus 70 and a paper feed apparatus 80 are disposed on the right side of the main body, and transfer paper transport system 75 and 85 are disposed between a transfer drum 55 and the fixing apparatus 70 and between the transfer drum 55 and a paper feed apparatus 80 having transfer paper cassettes 80a and 80b.

The developing apparatus 100 has developing units 101M (magenta), 101C (cyan), 101Y (yellow) and 101BK (black), all of which are releasably held by a carriage 120, and develop a toner image of a color-separated latent image of each color by a developing unit corresponding to each color.

The transfer apparatus 55 comprises a transfer drum 55b having a gripper 55a for holding transfer paper P on the peripheral surface thereof. The transfer drum 55 holds by a gripper 55a the leading edge portion of the transfer paper P fed from a transfer paper cassette 80a or 80b of the paper feed apparatus 80 through the transfer paper transport system 85. The transfer paper P is adhered to the transfer drum 55b by the action of an adhesion charger 54 disposed inside the transfer drum 55b, and is rotated to transfer the toner image of each color onto the photosensitive drum 51. In the transfer area, a transfer charger 55c is disposed within the transfer drum 55.

The transfer paper P on which toner images of each color are in turn transferred is separated from the gripper 55a of the transfer drum 55b by separation chargers 58a and 58b. Next the transfer paper P is sent to the fixing apparatus 70 by means of the transfer paper transport system 75. The toner image on the transfer paper P is fixed and then ejected onto a paper ejection tray 73.

In the image forming apparatus constructed as described above, the imaging processes of charging, exposure, development, transfer and cleaning are performed on the photosensitive drum 51 by the primary charger 52, the optical system 60, the developing apparatus 100 the transfer apparatus 55 and the cleaning apparatus 57 for each color separated by the image sensor 65.

An image formed by reflected light from a manuscript scanned by the first to third scanning mirrors 61 to 63 is passed through the image-forming lens 64, and color-separated by the image sensor 65 having an RGB color-separation filter and converted into electrical signals. These manuscript information signals are converted from analog to digital form, and sent out to an image processing section (not shown) as digital image signals.

After the image processing section performs various image processing, such as logarithm conversion, UCR, masking, or gradation correction, it modulates a semiconductor laser 1 shown in FIG. 1 or 4 inside a laser scanner unit 66 in synchronization with a predetermined timing signal (the above-mentioned BD signal). The laser beam emitted from the semiconductor laser 1 scans the photosensitive drum 51 through the polygon mirror 2 and the image-forming lens 3 within the laser scanner unit 66, thus forming an electrostatic latent image. The formed electrostatic latent images are in turn developed by the developing apparatus 100 and formed into a toner image, transferred onto the transfer paper P by the transfer apparatus 55, and then fixed by the fixing apparatus 70 and ejected. Needless to say, laser beam detecting processing for AF adjustment is performed by the single detector 801 concurrently with the scanning of a laser beam for image formation as described above.

Although in the above-described embodiment a control signal for AF adjustment and a BD signal as a horizontal synchronization signal are obtained by the single detector 801, the output from the detector 801 may be used to control the amount of light of the semiconductor laser 1, as disclosed in U.S. Pat. No. 4,201,994.

As described above, according to the present invention, since the routing of optical signal output which are output one after another from detecting means to an objective signal generating means is controlled by output control means when a light beam scanned and exposed on a photosensitive body is continuously detected, a light beam which becomes a source signal for a predetermined control signal generated by and output from the various signal generating means can be detected by a single detecting means.

As a result, even if the signal generating means increases in number, the following advantages can be obtained: a detection circuit mechanism for detecting a light beam which becomes a source signal can be simplified, and the cost of circuits can be reduced considerably as compared with the prior art.

Many different embodiments of the present invention may be constructed without departing from the spirit and scope of the present invention. It should be understood that the present invention is not limited to the specific embodiments described in this specification. To the contrary the present invention is intended to cover various modifications and equivalent arrangements included with the spirit and scope of the claims. The following claims are to be accorded the broadest interpretation, so as to encompass all such modifications and equivalent structures and functions.

What is claimed is:

1. An image forming apparatus for forming images by allowing a light beam to be scanned and exposed on a photosensitive body, comprising:

single detecting means for detecting the light beam scanned and exposed onto the photosensitive body;

a plurality of signal generating means for generating a predetermined control signal based on an output from the detecting means; and output control means for controlling an optical signal output which is output from said detecting means to be routed to any one of said plurality of signal generating means.

2. An image forming apparatus according to claim 1, further comprising a light shielding plate having slits which guide the light beam to said detecting means.

3. An image forming apparatus according to claim 2, wherein said light shielding plate has a plurality of slits, each of which corresponds to each said signal generating means.

4. An image forming apparatus according to claim 1, wherein one of said plurality of signal generating means generates a control signal for auto-focus control.

5. An image forming apparatus according to claim 1, wherein one of said plurality of signal generating means generates a vertical synchronization signal as the control signal.

6. A light scanning apparatus comprising:

detecting means for detecting scanning light at a predetermined position;

a light shielding member, having a plurality of slits, disposed on an optical path through which the scanning light is guided to said detecting means; and means for supplying outputs of said detecting means to one of a plurality of circuits selectively.

7. A light scanning apparatus according to claim 6, wherein one of said plurality of circuits outputs a horizontal synchronization signal in response to the output of said detecting means.

8. A light scanning apparatus according to claim 6, wherein one of said plurality of circuits generates a signal for auto focus of the scanning light in response to the output of said detecting means.

9. A light scanning apparatus according to claim 6, wherein one of said plurality of slits is provided for scanning position adjustment of the scanning light.

10. A scanning light apparatus according to claim 6, wherein said supplying means includes switch means whose opening and closing are controlled at a predetermined timing.

11. A light scanning apparatus comprising: detecting means for detecting scanning light at a predetermined position;

a light shielding member, having a plurality of slits, disposed on an optical path through which the scanning light is guided to said detecting means; and means for outputting a horizontal synchronization signal in response to a detection signal corresponding to one of said plurality of slits.

12. A scanning light apparatus according to claim 11, further comprising means for generating a signal for auto focus of the scanning light in response to a detection signal corresponding to the others of said plurality of slits.

13. A scanning light apparatus according to claim 11, wherein one of said plurality of slits is provided for scanning position adjustment of the scanning light.

14. A scanning light apparatus according to claim 11, further comprising means for supplying an output of said detecting means to said horizontal synchronization signal output means at a timing corresponding to said one of said plurality of slits.

15. A light scanning apparatus according to claim 12, further comprising means for supplying an output of said detecting means to said horizontal synchronization signal output means at a timing corresponding to said one of said plurality of slits, and for supplying an output of said detecting means to said auto focus signal generating at a timing corresponding to said others of said plurality of slits.

16. An image forming apparatus comprising:

detecting means for detecting scanning light at a predetermined position;

a light shielding member, having a plurality of slits, disposed on an optical path through which the scanning light is guided to said detecting means;

means for outputting a horizontal synchronization signal in response to a detection signal corresponding to one of said plurality of slits; and means for modulating the scanning light with an image signal in synchronization with the horizontal synchronization signal.

17. An image forming apparatus according to claim 16, further comprising means for generating a signal for auto focus of the scanning light in response to a detection signal corresponding to the others of said plurality of slits.

18. An image forming apparatus according to claim 16, wherein one of said plurality of slits is provided for scanning position adjustment of the scanning light.

19. An image forming apparatus according to claim 16, further comprising a photosensitive member exposed and scanned by the scanning light.

20. An image forming apparatus according to claim 19, further comprising a plurality of developing devices each corresponding to a different color, for developing a latent image formed on said photosensitive member.

* * * * *

UNITED STATES PATENT AND TRADEMARK OFFICE
CERTIFICATE OF CORRECTION

PATENT NO. : 5,570,195

DATED : October 29, 1996

INVENTOR(S) : TSUNAO HONBO

It is certified that error appears in the above-identified patent and that said Letters Patent is hereby corrected as shown below:

```
On the title page, item [54], and column 1:

In the title, change "IMAGE FORMING APPARATUS
WHICH DETECTS SCANNING LIGHT THROUGH SLITTED SHIELD PLATE"
to --IMAGE PROCESSING APPARATUS WHICH DETECTS SCANNING LIGHT
THROUGH SLITTED SHIELD PLATE--.
```

Signed and Sealed this

Ninth Day of September, 1997

*Attest:*

BRUCE LEHMAN

*Attesting Officer*     *Commissioner of Patents and Trademarks*